Jan. 16, 1940.   J. BERGMANS   2,187,071
OPTICAL SYSTEM
Filed Feb. 10, 1938   2 Sheets-Sheet 1
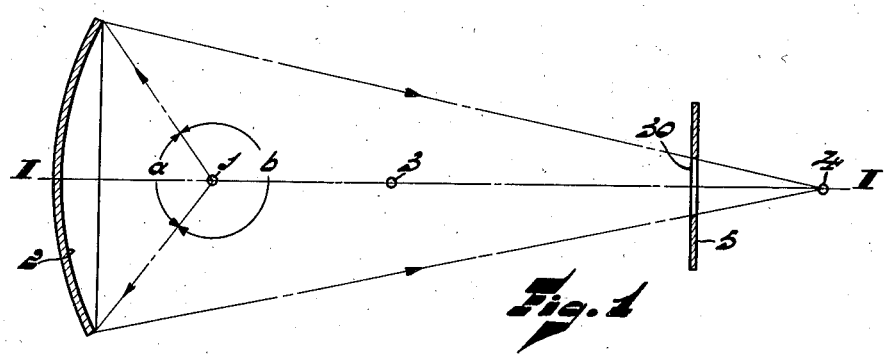
Fig. 1
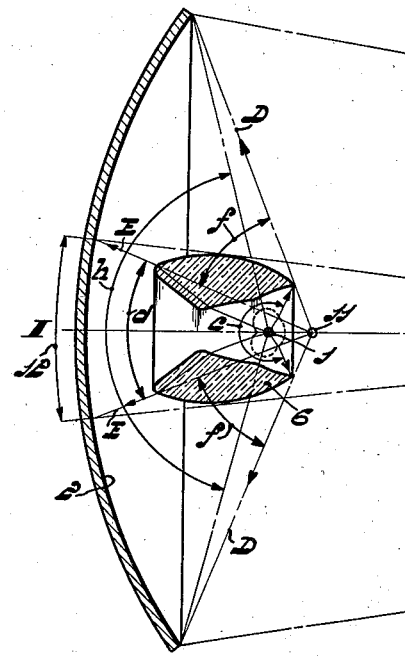
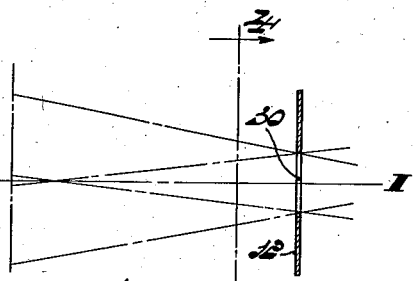
Fig. 2
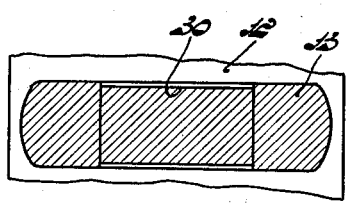
Fig. 24
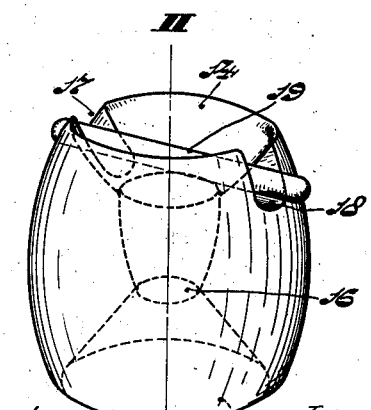
Fig. 5
INVENTOR
J. Bergmans
BY
E. F. Wendroth
ATTORNEY

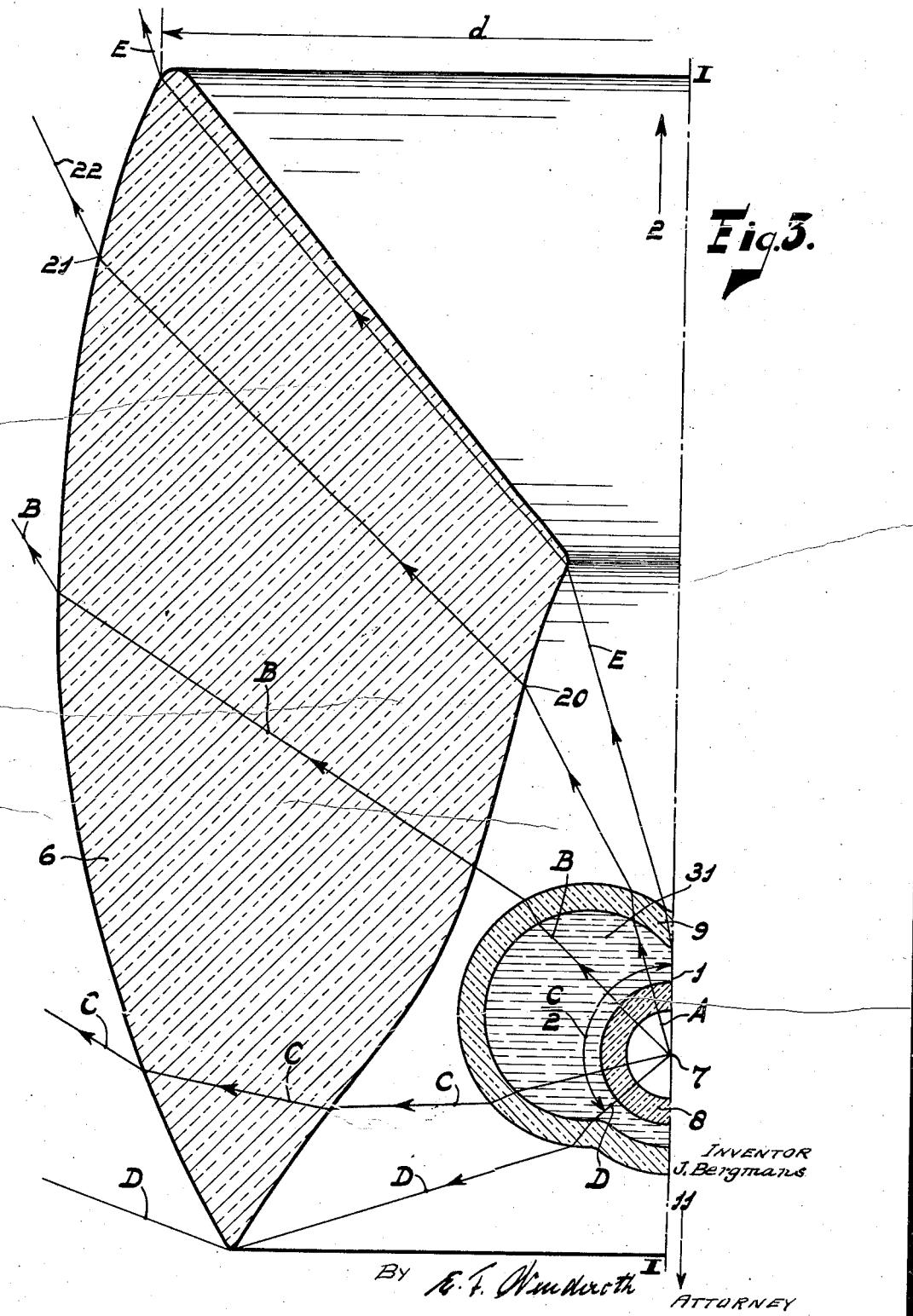

Patented Jan. 16, 1940

2,187,071

UNITED STATES PATENT OFFICE 2,187,071

OPTICAL SYSTEM

Jan Bergmans, Eindhoven, Netherlands, assignor to N. V. Philips' Gloeilampenfabrieken, Eindhoven, Netherlands Application February 10, 1938, Serial No. 189,872
In the Netherlands February 27, 1937

2 Claims. (Cl. 88—24)

My invention relates to optical systems having a condenser system.

In known optical systems of the above type a comparatively large proportion of the light emitted by the cooperating light source is not utilized by the condenser system. More particularly, with condenser systems of the lens type it is absolutely impossible to intercept the emitted light in a solid angle exceeding 180°, and although theoretically it is possible to intercept this light within a solid angle slightly smaller than 180°, in practice a solid angle of 90° is considered the maximum because of faults inherent to lenses. With mirror condenser systems the conditions are slightly different, and it is in practice possible to intercept light radiated by a light source in a solid angle of 180°. However, although such mirror condensers have been manufactured, it has been found that there are comparatively large differences in magnification between the portions of the mirror condenser remote from the top and the portions in the vicinity of the top. As a result there is a nonuniform brightness of the illuminated surface, which may be accounted for by the finite dimensions of the light source which coooperate with the condenser. Because of this the maximum solid angle within which a mirror condenser can intercept light from a light source is considered to be about 120°.

From the above it appears that the existing condenser systems can utilize only a comparatively small portion of the light emitted by a light source, and this constitutes a serious drawback because the purpose of such systems is to concentrate as much as possible of the emitted light in a beam. The light which is not utilized by the condenser system is of no interset for the purpose aimed at, i. e., for the intense illumination of a surface or object, and must be considered as being substantially lost.

The main object of my invention is to overcome the above difficulties and to provide an optical system in which a maximum amount of the light emitted by a light source is treated by the condenser system and used for the intended purpose.

Another object of my invention is to provide an optical system which is particularly adapted for linear light sources, such as artificially-cooled high-pressure metal-vapor discharge tubes.

A still further object of my invention is to provide an optical system which facilitates replacing the arc lamp of an existing apparatus with a high-pressure metal-vapor discharge tube.

Further objects of my invention will appear as the description progresses.

In accordance with the invention, I provide in the vicinity of the light source and between the same and the condenser system, refracting means which intercept over a solid angle of preferably more than 120°, the light emitted by the portion of the light source located in the axis of the system or in the immediate vicinity thereof. These means have refracting surfaces which are so shaped and arranged that the intercepted light is directed upon the condenser system within a solid angle of less than 120°.

By using such a refracting means in either a lens or mirror condenser system, it is possible to arrange the light source at a convenient distance from the condenser, and to use mirrors or lenses of the usual size, while at the same time I obtain the great advantage that a much greater portion of the emitted light is treated by the condenser system than in present systems.

In one embodiment of the invention, which is applicable to mirror condensers, I so form the refracting means that the emitted light rays traveling toward a central portion of the mirror condenser are deflected from the axis of the system and are directed upon an outer portion of the mirror. In such cases the mirror may be provided with a central aperture for inserting the light source in the system, whereas the deflected light is utilized.

The refracting means may be in the form of prisms, but I prefer to use refracting surfaces acting as lenses, and a very favorable costruction is obtained by utilizing the boundary surface of an annular lens having a cavity in which at least part of the light source is disposed. This cavity should preferably be of conical shape and adjoin another cavity formed in the lens; the construction being such that the lens, which is preferably formed as a solid of revolution, has a central bore.

The position and shape of the boundary refracting surfaces must, of course, be determined for each particular case, but in general they are so calculated by known optical laws that, instead of the portion of the light source located in the axis of the system, an imaginary punctiform light source is formed which is located at a greater distance from the condenser than is the real light source.

In one embodiment of the optical system according to the invention, which is particularly suitable for illuminating a film gate for motion picture apparatus, I use a linear light source, such as a super-high-pressure mercury-vapor discharge tube, and arrange the same with its elongated discharge path perpendicular to the axis of the system. By using the proper refracting means, the mirror produces a light beam which forms on a surface perpendicular to the axis of the system at the point of convergence of the beam or in the neighborhood thereof, i. e., at the film gate, a luminous spot of substantially rectangular cross-section and constant brilliancy even in the direction of the smallest dimension of the light source.

When using an artificially cooled super-high-pressure metal vapor discharge tube as the light source, the glass vessel which surrounds this light source and serves as a container for the cooling liquid is preferably formed in such manner that it cooperates with the refracting means to produce the desired effect on the light rays.

In order that the invention may be clearly understood and readily carried into effect, I shall describe the same in more detail with reference to the accompanying drawings, in which:

Figure 1 is a diagrammatic view of an optical system according to the prior art, Fig. 2 is a partly-sectionized diagrammatic view of an optical system according to the invention, Fig. 3 is an enlarged sectionized view of a portion of the optical system of Fig. 2, Fig. 4 is a view along line 4—4 of Fig. 2, and Fig. 5 is a prospective view of a lens according to the invention.

In the optical system shown in Fig. 1, a light source 1 is arranged on the axis I—I of the system, and between a film gate 5 and a spherically-shaped condenser mirror 2 having a center of curvature at point 3. A portion of the light rays leaving source 1 strike mirror 2, and are reflected thereby to pass through an aperture 30 of film gate 5 and converge at a point 4.

From Fig. 1 it appears that only a relatively small portion of the light emitted by source 1, i. e. the light within angle $a$, will be directed upon mirror 2. As has been stated, the angle $a$ has in practice a maximum value of about 120°. The rays of light which leave the light source within a solid angle $b$, i. e., about 240°, are not directed upon the mirror 2 and must therefore be considered as being substantially lost for the intended purpose. As a result such systems have a low light efficiency.

As shown in Fig. 2, the conditions become quite different when, in accordance with the invention, an annular lens 6 of suitable shape (later to be discussed) is placed in the vicinity of the light source 1 and partly surrounds the same. As appears from this figure, the light emitted from source 1 over an angle $c$ is directed upon the mirror 2, and this angle is considerably larger than the angle $h$ which represents the angle of the light directed upon mirror 2 without lens 6. As a result there is a considerable increase in the efficiency of the system.

The relative arrangement of lens 6 and light source 1 will be considered in more detail with reference to Fig. 3 in which light source 1 has the form of a super-high-pressure mercury-vapor discharge tube such as described in the U. S. Patents 2,094,694 and 2,094,695 to Bol et al. The light source is arranged with its elongated discharge path perpendicular to the axis I—I of the system and has an envelope 8 of glass or quartz. A container 9 of transparent glass surrounds envelope 8 and forms a space for a circulating cooling liquid 31 for instance, water.

Lens 6, as well as container 9, are so shaped and arranged with respect to the light source that the light emitted thereby over an angle greater than 120° is directed upon the mirror 2. Consider for example a ray A which leaves the light source 1 and passes through envelope 8 without being refracted because it strikes and leaves the surfaces of this envelope perpendicularly. Upon leaving the wall of container 9 and passing into the air, ray A is refracted toward the normal in accordance with Huygen's law and strikes the inner surface of lens 6 at a point 20. After passing through lens 6 the ray passes into the air at a point 21 and is again refracted to a direction 22 in which it passes to the mirror 2, which is not shown but is located at some distance above the figure as indicated by the arrow 2. The light ray 22 apparently comes from the point 11 of Fig. 2, which in Fig. 3 is located in the axis I—I and at some distance below the figure, as indicated by arrow 11.

The paths of the light rays B and C are determined in a similar manner, and after being refracted by lens 6, also appear to come from the point 11. The paths of two extreme light rays are indicated by reference letters D and E.

From Fig. 3 it appears that lens 6 and container 9 will intercept and direct toward the mirror 2 the emitted light contained within an angle $c$, which has a value considerably greater than that of the angle $a$ in Fig. 1 or the angle $h$ in Fig. 2. It should be noted that Fig. 3 shows only half of the system and hence only angle $$\frac{c}{2}$$

is shown.

It should also be noted that because of the relative position of lens 6 and of the mirror condenser 2, and because of the refraction caused by container 9 no light falls on the condenser mirror within the angle $d$ of Fig. 2. As a result a circular portion 12 of this mirror, which corresponds to angle $d$ (see Fig. 2) need not be formed as a reflector and may be removed to permit introducing light source 1 and lens 6 into the system. The mirrors commonly used in motion picture projections are usually provided with such a central aperture and in such cases the light emitted by light source and directed toward this aperture would be lost. Furthermore if the mirror were not provided with a central aperture and the light source used were for example a mercury-vapor discharge tube and had the property of absorbing the light rays reflected by this position, this would also result in a loss of light. However, when using a system such as shown in Figs. 2 and 3 the light which would normally strike this portion is directed to the outer portion of the mirror and is utilized.

Furthermore, by using a lens such as lens 6, it is possible to readily replace a light source, for instance a carbon arc, of an existing mirror condenser system, such as is used in a motion picture projector, with a high-pressure metal vapor discharge tube. In the past such a replacement was rather involved and necessitated changes in the apparatus. However, when using the lens according to the invention, it is only necessary to remove the carbon arc and substitute therefor a high-pressure metal-vapor discharge tube and a lens such as shown in Fig. 3.

Referring now to Fig. 2, this figure also shows the relative positions of the condenser mirror 2, light source 1, and the lens 6 as well as the position of the film gate 12 which is located at some distance from the mirror as indicated by a brake in the figure. This figure shows very distinctly the advantages of the lens 6 with respect to the angle over which the mirror 2 receives its light from the light source. If lens 6 were not present, the light source, as previously stated, could throw light on the mirror 2 only over an angle $h$. This angle $h$ is increased by the lens 6 to the angle $c$ which is nearly twice as large as angle $h$. Because of the above-described effect of the lens 6 on the rays within angle $d$, the light intercepted within the angle $c$ is divided in this figure into two portions in such manner that this light falls on mirror 2 within two angles $f$. The two beams indicated by angle $f$ (properly speaking one annular beam) are reflected by mirror 2 and produce a very uniform illumination of the film gate, which has as a rule a height of about 18 mms.

As stated, light source 1 has a linear discharge path and is arranged with its longitudinal direction perpendicular to the plane of drawing in Fig. 2. Although the thickness of the discharge path is only about 1 mm., the arrangement shown in Fig. 2 makes it possible to increase the thickness to such an extent that the film gate 12 is illuminated practically uniformly also in the direction of its height as the lens 6 is enlarging the dimensions of the light source in such a manner, that the small thickness of the discharge path is increased to a value, which practically corresponds with the height of the film gate. This is shown in Fig. 4 in which the hatched portion 13 represents the luminous spot formed on the gate, which spot is of substantially constant brilliancy throughout.

The lens 6 of Figs. 2 and 3 is shown in prospective and on an enlarged scale in Fig. 5. The lens has barrel-like external surface and is provided with a central bore formed of two conical-shaped end cavities 14 and 15 which are connected by a bore 16. As shown the surfaces of cavity 19 and bore 16 are formed by revolving a concave line around axis II—II, whereas cavity 15 is formed by revolving a straight line. The upper rim of cavity 19 is provided with two diametrically opposite grooves 17 and 18 which are intended for accommodating a light source. As shown in the figure, a light source together with its cooling vessel, such as illustrated in Fig. 3, is indicated by reference numeral 19.

Although I have described my invention in connection with light sources in the form of discharge tubes and with mirror condensers, it should be well understood that other light sources, such as incandescent lamps, and lens condensers systems can also be used. Furthermore, instead of being arranged with its discharge path perpendicular to the axis of the system, a linear light source can be arranged with its discharge path in the axis. In addition, the invention is not limited to use in motion picture projectors, but can be used in other apparatus such as searchlights. Therefore, I do not wish to be limited to the specific examples and applications used in describing the invention, but desire the appended claims to be construed as broadly as permissible in view of the prior art.

What I claim is:

1. An optical system comprising a mirror condenser having a center of curvature on the axis of the system, a linear light source arranged perpendicular to said axis and having a light-emitting portion at a point on said axis between said condenser and said center of curvature, a cooling jacket of transparent material surrounding said light source, and refracting means intercepting the light emitted by said light-emitting portion over a solid angle greater than 120° to direct the said light upon an outer annular portion of the condenser in a divergent bundle of light of annular cross section having an apical solid angle less than said first solid angle, said means including said cooling jacket, and a refracting member between said condenser and cooling jacket and partly surrounding the latter, said refracting member being an annular body provided with a barrel-like transparent outer surface and a cavity having a conically-shaped portion arranged coaxially with the axis of the system, a portion of the light source being within said cavity.

2. An optical system comprising a mirror condenser having a center of curvature on the axis of the system, a high-pressure mercury vapor discharge tube having a linear discharge path arranged perpendicular to said axis and having a portion at a point between said condenser and said center of curvature, means for artificially cooling said tube including a cooling jacket surrounding the same to form an intermediate space adapted to receive a cooling fluid, and refracting means intercepting the light emitted by said portion of the discharge path over a solid angle greater than 120° to direct the said light upon an outer annular portion of the condenser in a divergent bundle of light of annular cross section having an apical solid angle less than said first solid angle, said means including said cooling jacket and an annular lens encircling the axis of the system and having a barrel-like transparent outer surface and being provided with a cavity having a conically-shaped portion coaxial with the axis of the system, said tube being partly within said cavity.

JAN BERGMANS.